(12) United States Patent
Takishita et al.

(10) Patent No.: US 9,499,057 B2
(45) Date of Patent: Nov. 22, 2016

(54) ATTACHING STRUCTURE CAPABLE OF PREVENTING A SERVICE-PLUG FROM EXPOSURE TO WATER

(71) Applicants: YAZAKI CORPORATION, Tokyo (JP); TOYOTA JIDOSHA KABUSHIKI KAISHA, Toyota-shi, Aichi-ken (JP)

(72) Inventors: Ryuta Takishita, Kakegawa (JP); Masaaki Iwabe, Kakegawa (JP); Hiroyasu Matsumura, Kakegawa (JP); Kenji Eto, Toyota (JP); Makoto Motono, Toyota (JP); Go Yamada, Toyota (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 580 days.

(21) Appl. No.: 14/014,539

(22) Filed: Aug. 30, 2013

(65) Prior Publication Data
US 2014/0062182 A1 Mar. 6, 2014

(30) Foreign Application Priority Data
Aug. 31, 2012 (JP) .................. 2012-192563

(51) Int. Cl.
*B60L 11/18* (2006.01)
*B60L 3/00* (2006.01)

(52) U.S. Cl.
CPC .............. *B60L 11/18* (2013.01); *B60L 3/00* (2013.01); *B60L 11/1818* (2013.01);
(Continued)

(58) Field of Classification Search
CPC B60R 16/04; B60K 1/04; B60K 2001/0422; B60K 2001/0438; H01M 2/1083; H01M 2220/20; Y02T 90/14; Y02T 10/7077; Y02T 10/7005; Y02T 10/705; Y02T 10/7072; B60L 11/18; B60L 11/1818; B60L 11/1877; B60L 11/1879; B60L 3/00
See application file for complete search history.

(56) References Cited

U.S. PATENT DOCUMENTS

| 5,971,801 | A | 10/1999 | Kato et al. | |
|---|---|---|---|---|
| 7,610,978 | B2 * | 11/2009 | Takasaki | B60K 1/04 180/65.1 |

(Continued)

FOREIGN PATENT DOCUMENTS

| CN | 101409406 A | 4/2009 |
|---|---|---|
| CN | 101499381 A | 8/2009 |

(Continued)

OTHER PUBLICATIONS

Office Action dated Aug. 28, 2015, issued by the State Intellectual Property Office of the People's Republic of China in counterpart Chinese Application No. 201310392033.0.

(Continued)

*Primary Examiner* — J. Allen Shriver, II
*Assistant Examiner* — Jacob Meyer
(74) *Attorney, Agent, or Firm* — Sughrue Mion, PLLC

(57) ABSTRACT

An attaching structure for attaching a service-plug for shutting off and conducting an electric circuit of a vehicle to a power source device, comprises a floor panel constituting a bottom wall of a compartment of the vehicle and formed with an opening which faces the compartment; a metal plate disposed outside the vehicle than the floor panel and forming a cavity between the metal plate and the floor metal plate and covering the power source device, and including an attachment portion to which the service-plug is attached and raised toward the opening in the cavity; and a sealing member for keeping the cavity liquid-tight disposed between the floor panel and the metal sheet so as to surround the attachment portion; wherein the service-plug is detachably attached to the attachment portion so as to project toward the compartment through the opening.

2 Claims, 5 Drawing Sheets

(52) U.S. Cl.
CPC ....... B60L 11/1877 (2013.01); B60L 11/1879 (2013.01); *Y02T 10/705* (2013.01); *Y02T 10/7005* (2013.01); *Y02T 10/7072* (2013.01); *Y02T 90/14* (2013.01)

(56) References Cited

U.S. PATENT DOCUMENTS

| | | | |
|---|---|---|---|
| 7,654,352 B2* | 2/2010 | Takasaki | B60K 1/04 180/65.1 |
| 7,815,448 B2* | 10/2010 | Kawai | B60L 11/1822 439/157 |
| 8,007,313 B2 | 8/2011 | Deno et al. | |
| 8,079,435 B2* | 12/2011 | Takasaki | B60K 1/04 180/65.1 |
| 8,789,634 B2* | 7/2014 | Nitawaki | B60K 1/04 180/68.5 |
| 8,910,737 B2* | 12/2014 | Saeki | B60K 1/04 180/68.5 |
| 9,038,757 B2* | 5/2015 | Ogushi | B60K 1/04 180/68.5 |
| 9,073,426 B2* | 7/2015 | Tachikawa | B60K 1/04 |
| 2009/0047812 A1 | 2/2009 | Deno et al. | |
| 2009/0197456 A1* | 8/2009 | Kawai | B60L 11/1822 439/465 |
| 2009/0242299 A1* | 10/2009 | Takasaki | B60K 1/04 180/68.5 |
| 2011/0300427 A1 | 12/2011 | Iwasa et al. | |
| 2012/0160584 A1* | 6/2012 | Nitawaki | B60K 1/04 180/68.5 |
| 2013/0119757 A1* | 5/2013 | Tachikawa | B60K 1/04 307/9.1 |
| 2013/0127200 A1* | 5/2013 | Saeki | B60K 1/04 296/37.14 |

FOREIGN PATENT DOCUMENTS

| | | |
|---|---|---|
| CN | 101568443 A | 10/2009 |
| CN | 102136596 A | 7/2011 |
| CN | 102317097 A | 1/2012 |
| CN | 102555755 A | 7/2012 |
| CN | 102570148 A | 7/2012 |
| EP | 2072309 A1 | 6/2009 |
| EP | 2355209 A1 | 8/2011 |
| JP | 06344950 A * | 12/1994 |
| JP | 9104239 A | 4/1997 |
| JP | 2006-50769 A | 2/2006 |
| JP | 2009-083601 A | 4/2009 |
| JP | 2012-140054 A | 7/2012 |
| JP | 2013023163 A * | 2/2013 |

OTHER PUBLICATIONS

Communication dated Jan. 3, 2014, issued by the European Patent Office in corresponding Application No. 13182205.8.

Communication dated Apr. 26, 2016 issued by Japanese Intellectual Property Office in counterpart Japanese Application No. 2012-192563.

* cited by examiner

ATTACHING STRUCTURE CAPABLE OF PREVENTING A SERVICE-PLUG FROM EXPOSURE TO WATER

BACKGROUND OF THE INVENTION

1. Field of the Invention

The present invention relates to a service-plug attaching structure and, more particularly, to an attaching structure capable of preventing a service-plug from exposure to water.

2. Description of the Related Art

Such vehicles as electric vehicles which employ an electric motor and hybrid vehicles which employ both of an engine and an electric motor run as electric power is supplied from an on-board power source device to the electric motor. Such vehicles have high-voltage circuits which operate on the power source device, and are equipped with a service-plug (circuit opening/closing device) for shutting off and again conducting circuit currents of the high-voltage circuits to secure safety of a worker who carries out inspection/maintenance or troubleshooting work (refer to JP-A-9-104239).

Incidentally, power source devices are large, heavy high-voltage battery units and are composed of a battery assembly which is a series connection of plural secondary batteries, a pair of end plates which hold the battery assembly between themselves, an electric junction box disposed between the battery assembly and the electric motor, and other components. Therefore, conventionally, a dedicated frame (battery frame) is formed under a vehicle floor panel (floor metal plate) and a space (battery space) to house the power source device is secured between the battery frame and the floor metal plate. The power source device is mounted on the battery frame and housed in the battery space.

The service-plug is connected to both of a vehicle control unit (motor control unit) provided in a space (motor room) which is separate from the battery space and a harness (high-voltage harness) that is connected to the electric junction box, and can thereby shut off and again allow flow of electricity to high-voltage circuits (e.g., a connection circuit between the motor control unit and the electric junction box) which operates on the power source device, at an intermediate potential. Therefore, to electrically connect the motor control unit and the power source device (electric junction box) via the service-plug, it is necessary to make the high-voltage harness lead out of the battery frame and make necessary wiring. Since the electric junction box is mounted, together with the battery assembly, on the battery frame which is formed under the floor metal plate, in making the high-voltage harness lead out of the battery frame and making necessary wiring, it is necessary to take a thorough waterproof measure so that the put-out portion of the high-voltage harness is not exposed to water.

JP-A-9-104239 discloses a service-plug attaching structure in which such a waterproof measure is taken. In this attaching structure, a high-voltage harness passes through a vehicle body panel (dash panel) that separates a motor room and a vehicle compartment. An attaching/detaching unit for attaching and detaching a service-plug which is connected to the high-voltage harness is provided. A floor metal plate is formed with an opening through which the attaching/detaching unit projects, whereby the attaching/detaching unit is exposed to the vehicle compartment. In this attaching structure, since the attaching/detaching unit is exposed to the vehicle compartment, it is not necessary to make the high-voltage harness lead to (expose it to) the outside of the vehicle (vehicle compartment). This makes it possible to attach and detach the service-plug from the vehicle compartment, and to thereby safely perform connection work for high-voltage circuits (e.g., a connection circuit between a motor control unit and an electric junction box) which operate on a power source device.

However, the service-plug attaching structure disclosed in JP-A-9-104239 is merely such that a measure for preventing a put-out portion of the high-voltage harness from being exposed to water is taken by not exposing the high-voltage harness to the outside of the vehicle (vehicle compartment) whereas exposing the attaching/detaching unit to the vehicle compartment. Therefore, this measure is insufficient because it includes no waterproof measure against an event that water leaks to the neighborhood of the service-plug due to a careless act of a driver or passenger such as pushing-down of a cooler in the vehicle compartment or opening of a window in the rain, that is, it includes no measure for protecting the service-plug (in other words, attaching/detaching unit) against water leakage or water entrance in or into the vehicle compartment. If the service-plug were pulled out in a state that water exists around it, serious trouble might occur such as short-circuiting of the battery assembly.

SUMMARY OF THE INVENTION

The present invention has been made in view of the above, and an object of the invention is realize a service-plug attaching structure capable of reliably preventing a service-plug from exposure to water.

To solve the above problems, the invention provides with an attaching structure for attaching a service-plug for shutting off and conducting an electric circuit of a vehicle to a power source device, the attaching structure comprising a floor panel constituting a bottom wall of a vehicle compartment and formed with an opening which faces the vehicle compartment; a metal plate disposed outside the vehicle than the floor panel and forming a cavity between the metal plate and the floor metal plate and covering the power source device, and including an attachment portion to which the service-plug is attached, the attachment portion being raised toward the opening in the cavity; and a sealing member for keeping the cavity liquid-tight disposed between the floor panel and the metal sheet so as to surround the attachment portion; wherein the service-plug is detachably attached to the attachment portion so as to project toward the vehicle compartment through the opening.

With this attaching structure, the service-plug can be disposed distantly from the sealing member on the compartment side of the floor panel. As a result, the service-plug can be prevented from being exposed to or submerged in water even if water leakage occurs in the vehicle compartment. Furthermore, an ample working space is secured and the floor panel does not interfere with the service-plug when the service-plug is detached from or attached to the power source device. This makes it possible to carry out work of detaching or attaching the service-plug smoothly.

The above attaching structure may be configured in such a manner that the power source device comprises a connector unit for connection to an electric circuit that is lower in voltage than the above electric circuit and a plate member to which the service-plug and the connector unit are attached so as to be integrated with each other; and that the service-plug is attached to the attachment portion in a state that it is integrated with the connector unit by means of the plate member. Therefore, the service-plug and the connector unit can be dealt with in the state that they are integrated with each other and the number of components can thereby be reduced. Since the power source device is equipped with the connector unit, it is not necessary to, for example, wire, around the power source device, a low-voltage wire harness for connections to the low-voltage circuits of the vehicle, whereby the number of sealing members around the low-voltage wire harness can be reduced.

The invention can realize a service-plug attaching structure capable of reliably preventing a service-plug from exposure to water.

DESCRIPTION OF THE PREFERRED EMBODIMENTS

A service-plug attaching structure according to the present invention will be hereinafter described with reference to the accompanying drawings. The attaching structure according to the invention is to attach a service-plug for shutting off and conducting electric circuits of a vehicle, to a power source device in such a manner that it is prevented from being exposed to water.

Service-plugs serve to shut off and allow flow of electricity to high-voltage circuits which operate on a power source device for driving of an electric motor of such a vehicle as an electric vehicle which employs the electric motor and a hybrid vehicle which employs both of the electric motor and an engine. Thus, service-plugs secure safety of a worker and prevent accidents such as electric shocks when he or she carries out vehicle inspection/maintenance or troubleshooting work.

More specifically, the service-plug which serves as a circuit opening/closing device is ordinarily attached to the power source device. To start intended work, the service-plug is detached from the power source device to shut off circuit currents of the high-voltage circuits. After completion of the work, the service-plug is again attached to the power source device to allow flow of circuit currents of the high-voltage circuits.

Such a power source device can be composed of a battery assembly which is a series connection of plural secondary batteries (battery packs), a pair of end plates which hold the battery assembly between themselves, an electric junction box disposed between the battery assembly and the electric motor. The electric junction box may include a relay for on/off-controlling the connection between the battery assembly and the electric motor and a related circuit. In this case, the electric junction box may be configured in such a manner that the relay is held by an upper cover and the circuit is held by a lower cover and the upper cover and the lower cover are assembled together.

Figure 1:
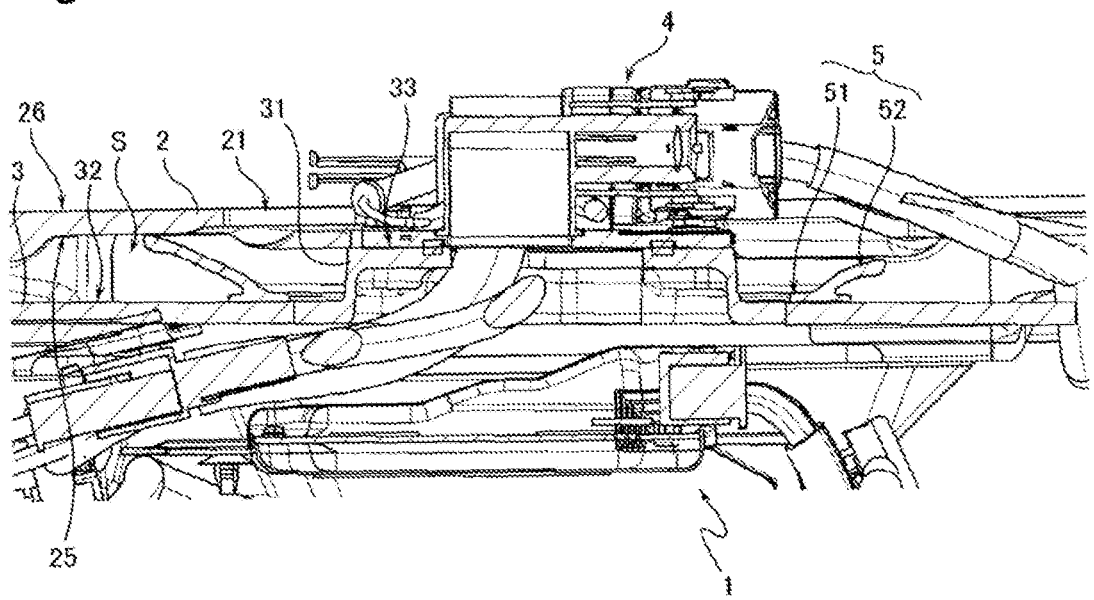
FIG. 1 is a sectional view showing the overall configuration of a service-plug attaching structure according to an embodiment of the present invention.
Figure 2:
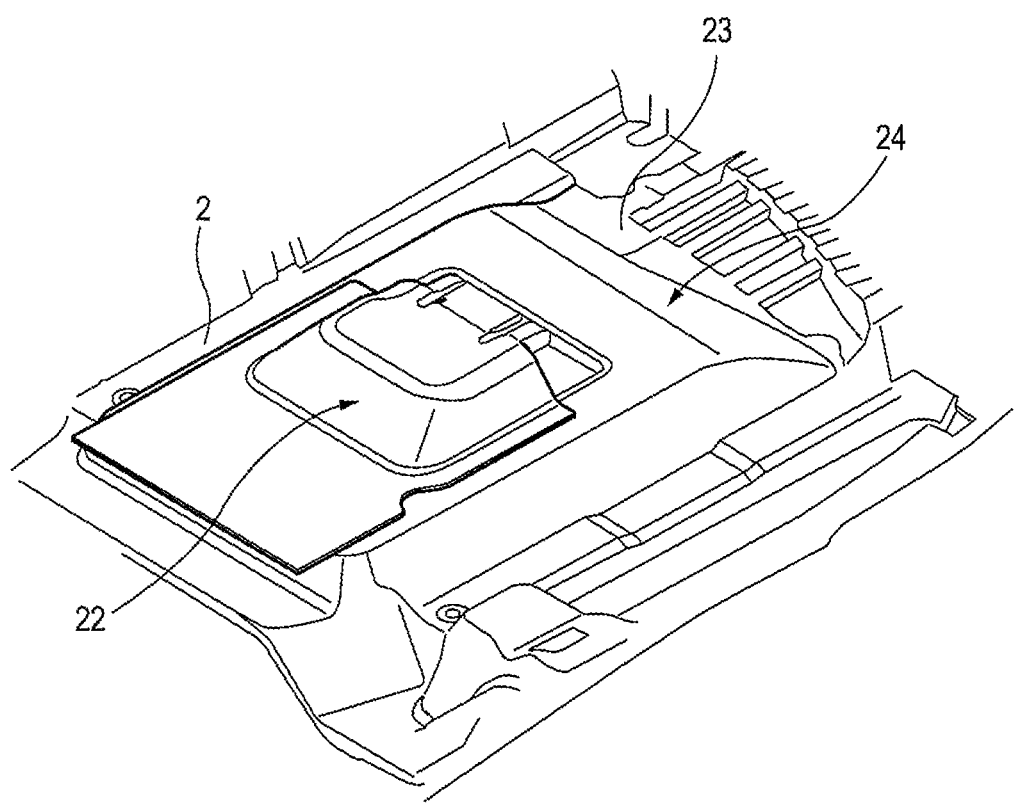
FIG. 2 is a perspective view of the service-plug attaching structure according to the embodiment of the invention.
Figure 3:
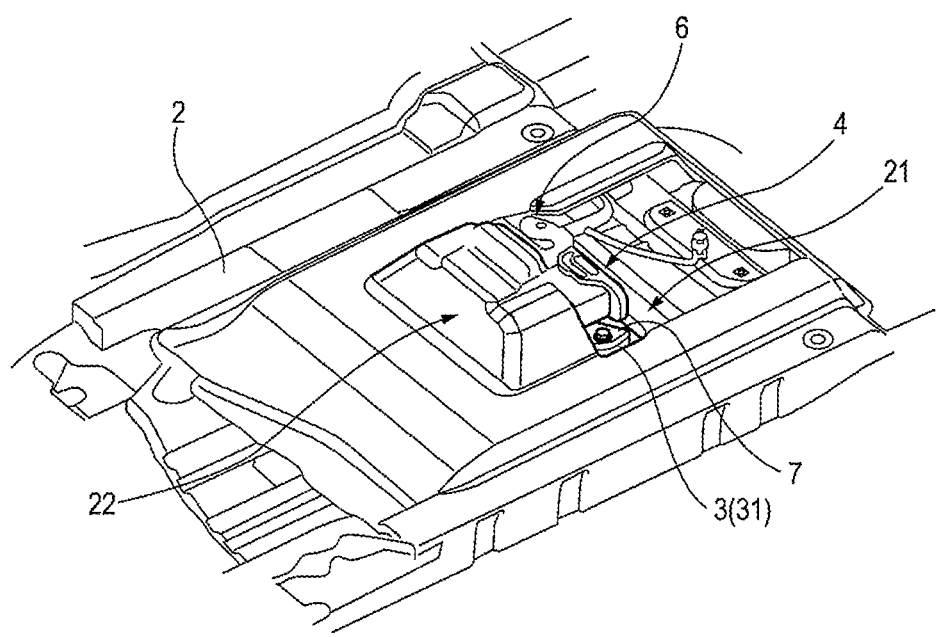
FIG. 3 is a perspective view of the service-plug attaching structure in a state that a metal plate cover is removed.

FIGS. 1-3 show the overall configuration of a service-plug attaching structure according to an embodiment of the invention. FIGS. 1 and 2 are a sectional view and a perspective view, respectively, of the service-plug attaching structure. FIG. 3 is a perspective view of the service-plug attaching structure in a state that a metal plate cover (described later) is removed.

With the service-plug attaching structure according to the embodiment, a power source device 1 is disposed outside a floor panel (hereinafter referred to as a floor metal plate) 2 which constitutes the bottom wall of the vehicle compartment, and is covered with a metal plate (hereinafter referred to as a battery pack metal plate) 3. A cavity S is formed between the floor metal plate 2 and the battery pack metal plate 3.

The floor metal plate 2 which is one vehicle body members constitutes the bottom wall of the vehicle compartment, and driver/passenger seats (not shown) are disposed on the floor metal plate 2. The floor metal plate 2 is formed with an opening 21 which faces the vehicle compartment. The embodiment assumes an example case that the opening 21 is formed under the front passenger seat (not shown). In the embodiment, no limitation is imposed on the size of the opening because it can be set according to the size of a service-plug 4 (described later) and other factors.

As shown in FIGS. 2 and 3, the floor metal plate 2 is formed with a swell portion 22 which swells into the vehicle compartment so as to cover part (e.g., about ⅓) of the opening 21. The swell portion 22 covers part (e.g., about ⅓) of the service-plug 4 which is attached to an attachment portion 31 (described later) of the battery pack metal plate 3 and projects toward the vehicle compartment through the opening 21. The swell portion 22 is omitted in FIG. 1.

In addition, as shown in FIG. 2, the floor metal plate 2 is equipped with a separate cover member (hereinafter referred to as a metal plate cover) 23 covers that part of the opening 21 which is not covered with the swell portion 22. The metal plate cover 23 has a cover swell portion 24 which swells into the vehicle compartment like the swell portion 22. As such, the cover swell portion 24 covers that part (e.g., about ⅔) of the opening 21 which is not covered with the swell portion 22. The metal plate cover 23 is attached to the floor metal plate 2 in such a manner that end portions of the cover swell portion 24 and the swell portion 22 coextend with each other.

While the vehicle is in an ordinary state (i.e., the vehicle is not being subjected to inspection/maintenance, troubleshooting work, or the like), the metal plate cover 23 is attached to the floor metal plate 2. Therefore, while the vehicle is in the ordinary state, the opening 21 of the floor metal plate 2, in other words, the service-plug 4 which projects toward the vehicle compartment through the opening 21, is covered with the swell portion 22 and the cover swell portion 24.

The method for attaching the metal plate cover 23 to the floor metal plate 2 is not limited to any particular method, that is, may be an arbitrary method. However, so that the service-plug 4 which projects toward the vehicle compartment through the opening 21 can be exposed easily by removing the metal plate cover 23, it is preferable that the metal plate cover 23 be attached to the floor metal plate 2 with fastening members such as bolts that can be removed easily.

The battery pack metal plate 3 is a member with which the power source device 1 is covered so as not to be exposed to the outside. For example, a chassis member (not shown) to be mounted with the power source device 1 is disposed outside (below in FIG. 1) the floor metal plate 2 and the vehicle compartment side (top side in FIG. 1) of the power source device 1 which is housed in the chassis member is covered with the battery pack metal plate 3.

The battery pack metal plate 3 is formed with the attachment portion 31 (to which the service-plug 4 is attached) in such a manner that the attachment portion 31 is raised into the cavity S toward the opening 21 of the floor metal plate 2. As such, the battery pack metal plate 3 also serves as a member to which the service-plug 4 is attached. The attachment portion 31 is raised into the cavity S from a flat portion 32 of the battery pack metal plate 3 and has an elevated surface 33 which is approximately parallel with the flat portion 32 and faces the opening 21.

Figure 4:
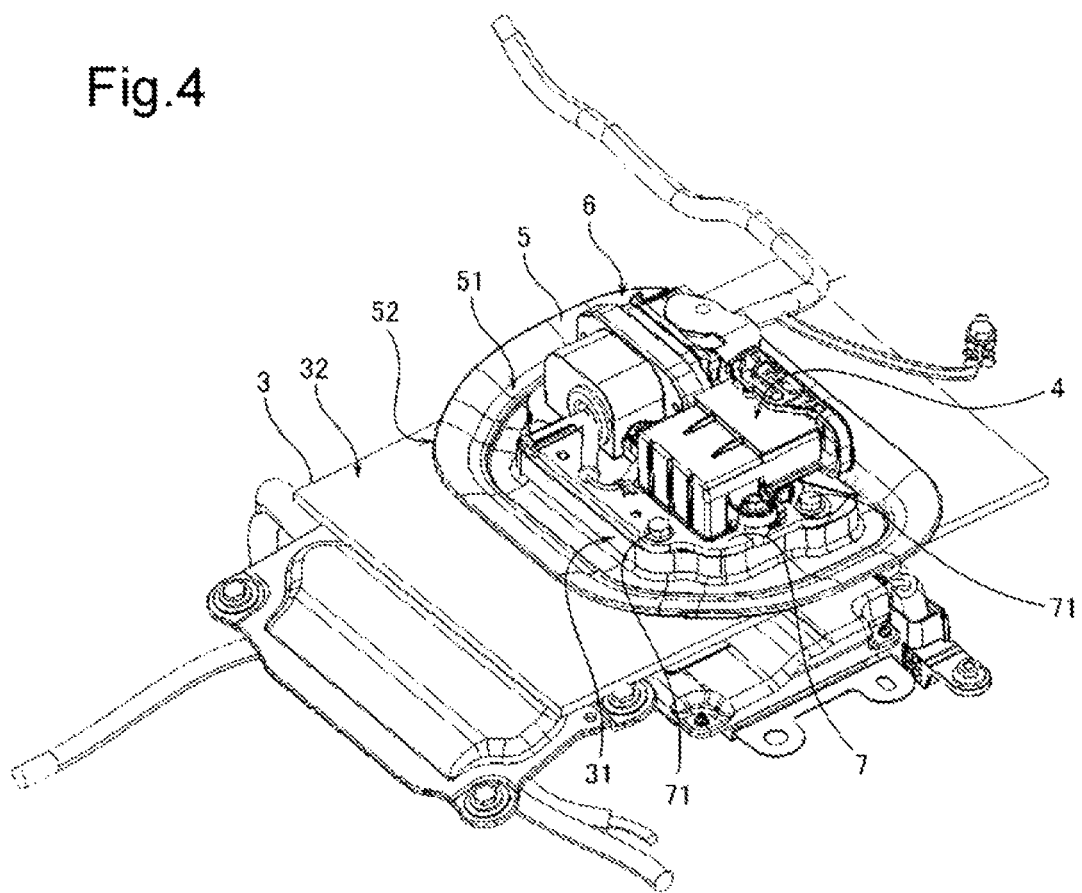
FIG. 4 is a rough perspective view of the service-plug attaching structure in a state that a floor metal plate is removed.

As shown in FIG. 4, a sealing member 5 for keeping part of the cavity S liquid-tight is disposed between the floor metal plate 2 and the battery pack metal plate 3 so as to surround the attachment portion 31. FIG. 4 is a rough perspective view of the service-plug attaching structure according to the embodiment in a state that the floor metal plate 2 is removed. The sealing member 5 has an annular, flat main body 51 which surrounds the attachment portion 31 and a lip portion 52 which extends around the entire outer circumference of the main body 51. For example, the sealing member 5 can be formed by forming an annular main body 51 by, for example, pressing a metal plate and connecting a lip portion 52 made of an elastic material such as a resin to the outer circumference of the thus-formed metal plate (main body 51) through coating, vulcanization, or the like.

The main body 51 of the sealing member 5 is fixed to and positioned with respect to the battery pack metal plate 3 in a state that the lip portion 52 is in contact with an outer surface 25 (bottom surface in FIG. 1) of the floor metal plate 2. As a result, the part of the cavity S can be sealed from the opening 21 of the floor metal plate 2. That is, the sealing member 5 can prevent entrance of water into the part of the cavity S through the opening 21 (stated in plainer words, from the vehicle compartment). As a result, exposure of the power source device 1 to water can be prevented effectively.

In FIGS. 1 and 4, the sealing member 5 is configured in such a manner that the main body 51 is fixed to and positioned with respect to the battery pack metal plate 3 and the lip portion 52 is in contact with the floor metal plate 2. Another sealing member is conceivable in which a main body is fixed to and positioned with respect to the floor metal plate 2 and the lip portion 52 is in contact with the battery pack metal plate 3. Other conceivable examples are as follows: a sealing member is fixed to and positioned with respect to a compartment-side surface 26 of the floor metal plate 2 and a lip portion is in contact with the metal plate cover 23, and a sealing member is fixed to and positioned with respect to the metal plate cover 23 and a lip portion is in contact with the surface 26 of the floor metal plate 2. Even a sealing member without a lip portion is also possible in which a generally annular elastic sealing member made of a resin or the like is disposed in the cavity S so as to surround the attachment portion 31. As such, a sealing member for sealing a water entrance path from the vehicle compartment to the power source device 1 via the opening may be disposed at an arbitrary position as long as it is on that water entrance path.

The service-plug 4 is attached detachably to the attachment portion 31 of the battery pack metal plate 3 so as to project toward the vehicle compartment through the opening 21 of the floor metal plate 2. Since as described above the attachment portion 31 is raised into the cavity S toward the opening 21 of the floor metal plate 2, the service-plug 4 projects toward the vehicle compartment through the opening of the floor metal plate 2 (see FIG. 1) when attached to the attachment portion 31 (more specifically, elevated surface 33).

From a different perspective, since the sealing member 5 is disposed in the cavity S so as to surround the attachment portion 31, the service-plug 4 can be disposed distantly from the sealing member 5 on the compartment side of the floor metal plate 2 (see FIG. 1). Therefore, the elevation length of the attachment portion 31 is set slightly smaller than the height of the cavity S (the interval between the floor metal plate 2 and the battery pack metal plate 3). As a result, the elevated surface 33 of the attachment portion 31 can be located so as to be slightly lower than the compartment-side surface 26 of the floor metal plate 2 and the service-plug 4 which is attached to the elevated surface 33 can project toward the vehicle compartment through the opening 21. Although it is possible to set the elevation length of the attachment portion 31 approximately equal to or larger than the height of the cavity S, it is appropriate to set the elevation length of the attachment portion 31 so that the service-plug 4 does not project toward the vehicle compartment excessively.

Figure 5:
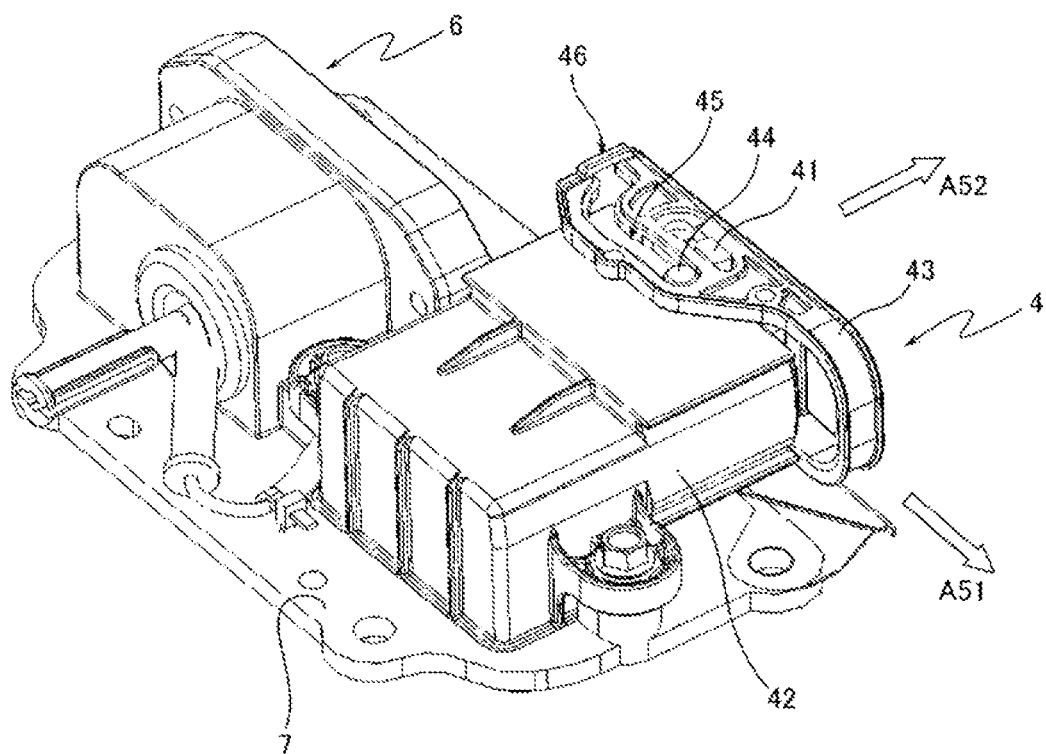
FIG. 5 is a rough perspective view showing a state that a service-plug and a connector unit are attached to a plate member and thereby integrated with each other.

In the embodiment, the power source device 1 is equipped with a connector unit 6 for connections to electric circuits (low-voltage circuits) which are lower in voltage than the electric circuits (high-voltage circuits) which are subjects of electricity shutoff/passage by the service-plug 4 and a plate member 7 to which the service-plug 4 and the connector unit 6 are attached so as to be integrated with each other. FIG. 5 is a rough perspective view showing a state that the service-plug 4 and the connector unit 6 are attached to the plate member 7 and thereby integrated with each other. The service-plug 4 is attached to the attachment portion 31 in the state that it is integrated with the connector unit 6 by the plate member 7. That is, the service-plug 4 and the connector unit 6 can be attached to the attachment portion 31 (more specifically, elevated surface 33) together by fixing the plate member 7 to the attachment portion 31 (elevated surface 33).

As described above, in the embodiment, the service-plug 4 which is connected to the power source device 1 in the state that the former is attached to the plate unit can shut off and again allow passage of electricity to connection circuits located between the high-voltage circuits (e.g., vehicle control units (not shown)) which operate on the power source device 1 and the electric junction box, at a prescribed potential (e.g., intermediate potential). As shown in FIG. 5, the service-plug 4 is equipped with a main unit 42 which incorporates a connection unit (not shown) for connection to the power source device 1 and a grip portion 43 which is connected to the connection unit and it to be gripped by a worker in removing the service-plug 4 from the power source device 1. The connection unit is connected to the grip portion 43 by a projection 41 (see FIG. 5). A pivotal support portion 44 which pivotally supports the grip portion 43 projects from the main unit 42, and the grip portion 43 is formed with a slide hole 45 which is engaged with the pivotal support portion 44. The slide hole 45 has an open end portion 46. The grip portion 43 is pivotally supported by the main unit 42 in a state that the pivotal support portion 44 is engaged with the slide hole 45. The grip portion 43 is movable with respect to the main unit 42 in the extending direction of the slide hole 45 with the pivotal support portion 44 engaged with the slide hole 45.

To detach the service-plug 4 from the power source device 1, force is applied to the grip portion 43 in the direction indicated by arrow A51 in FIG. 5 against the engagement between the slide hole 45 and the pivotal support portion 44, whereby the grip portion 43 can be slid to project from the main unit 42. Then, the pulled-out grip portion 43 is rotated about the pivotal support portion 44 and force is applied to the grip portion 43 in the direction indicated by arrow A52 in FIG. 5, whereby the slide hole 45 (its end portion 46) can be disengaged from the pivotal support portion 44. Then, force is further applied to the grip portion 43 in the direction indicated by arrow A52 in the state that the slide hole 45 is disengaged from the pivotal support portion 44, whereby the connection unit of the service-plug 4 is pulled out of the main unit 42 together with the grip portion which is connected to the connection unit by the projection 41.

As a result, circuit currents of the high-voltage circuits which operate on the power source device 1 can be shut off.

The service-plug 4 can be attached to the power source device 1 by doing prescribed work according to a procedure that is opposite to the above detachment procedure. By doing such attachment work, circuit currents of the high-voltage circuits are again allowed flow. In this manner, the service-plug 4 can be attached to the power source device 1 (more specifically, the attachment portion 31 of the battery pack metal plate 3) in a detachable manner. Detachment work or attachment work is done in a state that the metal plate cover 23 is removed and the service-plug 4 is exposed to the vehicle compartment through the opening 21.

The connector unit 6 serves as a connection interface unit for low-voltage circuits such as a signal circuit for exchanging control information for the power source device 1 between the power source device 1 and control units (not shown) of the vehicle and power supply circuits for supplying power from a battery (e.g., 12-V lead battery) to control devices (e.g., the relay and related circuit of the electric junction box) of the power source device 1. The power source device 1 and the vehicle control units are interconnected via the connector unit 6 to form the low-voltage circuits and exchange control information for the power source device 1. The control devices of the power source device 1 are supplied with power from the battery via the connector unit 6.

Since the power source device 1 is equipped with the connector unit 6, it is not necessary to, for example, wire, around the power source device 1, a low-voltage wire harness for connections to the low-voltage circuits of the vehicle, whereby the number of sealing members around the low-voltage wire harness can be reduced. Even where such a low-voltage wire harness is wired around the power source device 1, the degree of freedom of determination of its wiring positions can be increased (layout-free).

The plate member 7 is shaped like a flat plate and extends parallel with the elevated surface 33 of the attachment portion 31. The service-plug 4 and the connector unit 6 are attached to the plate member 7 and thereby integrated with each other. Attached to the plate member 7, the service-plug 4 and the connector unit 6 can be dealt with in the state that they are integrated with each other and the number of components can thereby be reduced.

No particular limitation is imposed on the method for fixing the plate member 7 to the elevated surface 33. The embodiment employs an example method that as shown in FIG. 4 the plate member 7 is fastened with bolts 71. In the embodiment, the plate member 7 is shaped like a flat plate. An alternative structure is possible that the attachment portion of the battery pack metal plate 3 is flat and has surfaces that are approximately flush with the surfaces of the flat portion 32 and a plate portion is raised from the flat attachment portion into the cavity S so as to face the opening 21.

As described above, with the service-plug attaching structure according to the embodiment, the service-plug 4 is prevented effectively from being exposed to or submerged in water even in the event that water leaks to the neighborhood of the service-plug due to a careless act of a driver or passenger such as pushing-down of a cooler in the vehicle compartment or opening of a window in the rain. Such leakage water expands over the entire floor metal plate 2 including the swell portion 22 of the floor metal plate 2 and the cover swell portion 24 of the metal plate cover 23 with which the opening 21 are covered, and hence does not directly reach the opening 21. Therefore, even if water entered the cavity S through the opening 21, only part of the water would enter an inside portion (around the attachment portion 31) of the sealing member 5 in the cavity S and the water entrance into the inside portion of the sealing member 5 could be stopped at such a level that only a slight amount of water remains in the inside portion. Since the service-plug 4 is disposed distantly from the sealing member 5 on the compartment side of the floor metal plate 2, the service-plug 4 can reliably be prevented from being exposed to or submerged in water. As a result, the service-plug 4 can more safely be attached to the power source device 1 (more specifically, the attachment portion 31 of the battery pack metal plate 3) in a detachable manner. For example, it is possible to prevent serious trouble that the battery assembly of the power source device 1 is short-circuited by pulling out the service-plug 4 in a state that it is exposed to water.

Since the service-plug 4 is disposed on the compartment side of the floor metal plate 2, the floor metal plate 2 does not interfere with the connection unit (grip portion 43) when the service-plug 4 is detached from the power source device 1, more specifically, when connection unit is pulled out of the main unit 42. That is, with an ample working space, work of detaching the service-plug 4 can be carried out smoothly. Furthermore, since the connection unit of the service-plug 4 can be pulled out parallel with the floor metal plate 2 (e.g., in the horizontal direction), work of detaching the service-plug 4 can be carried out more smoothly even in the case where the service-plug 4 is located under the front passenger seat. Likewise, work of attaching the service-plug 4 can be conducted more smoothly.

This application is based upon and claims the benefit of priority of Japanese Patent Application 2012-192563 filed on Aug. 31, 2012, the contents of which are incorporated herein by reference.

What is claimed is:

1. An attaching structure for attaching a service-plug for shutting off and conducting an electric circuit of a vehicle to a power source device, the attaching structure comprising:
   a floor panel constituting a bottom wall of a compartment of the vehicle and formed with an opening which faces the compartment;
   a metal plate disposed on a side of the floor panel opposite the compartment and forming a cavity between the metal plate and the floor panel and covering the power source device, and including an attachment portion to which the service-plug is attached, the attachment portion extending toward the opening; and
   a sealing member disposed between and contacting both the floor panel and the metal plate so as to surround the attachment portion for sealing the cavity;

wherein the service-plug is attachable to the attachment portion so as to project toward the compartment through the opening.

2. An arrangement comprising an attaching structure for attaching a service-plug, the arrangement comprising:
   a power source device;
   the service-plug for shutting off and conducting a first electric circuit of a vehicle to the power source device;
   a floor panel constituting a bottom wall of a compartment of the vehicle and formed with an opening which faces the compartment;
   a metal plate disposed on a side of the floor panel opposite the compartment and forming a cavity between the metal plate and the floor panel and covering the power source device, and including an attachment portion to which the service-plug is attached, the attachment portion extending toward the opening; and
   a sealing member disposed between and contacting both the floor panel and the metal plate so as to surround the attachment portion for sealing the cavity,
   wherein the service-plug is attachable to the attachment portion so as to project toward the compartment through the opening,
   wherein the power source device comprises:
   a connector unit for connection to a second electric circuit having a voltage lower than a voltage of the first electric circuit and a plate member to which the service-plug and the connector unit are attachable so as to be integrated with each other; and
   in response to the service-plug being attached to the attachment portion, the service-plug is integrated with the connector unit by the plate member.

* * * * *